(12) United States Patent
Blumberg et al.

(10) Patent No.: US 7,027,689 B2
(45) Date of Patent: Apr. 11, 2006

(54) OPTICAL ROUTERS BASED ON SURFACE PLASMONS

(75) Inventors: Girsh Blumberg, New Providence, NJ (US); Brian S Dennis, Chatham, NJ (US); Dmitro M. Egorov, Allston, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 194 days.

(21) Appl. No.: 10/350,780

(22) Filed: Jan. 24, 2003

(65) Prior Publication Data

US 2004/0146246 A1 Jul. 29, 2004

(51) Int. Cl.
*H04J 14/00* (2006.01)
(52) U.S. Cl. .............................. 385/39; 398/49; 398/57; 385/42; 385/50
(58) Field of Classification Search .................... 385/2, 385/39, 42, 50, 130; 398/49, 57
See application file for complete search history.

(56) References Cited

U.S. PATENT DOCUMENTS 4,765,705 A    8/1988   Seymour et al. .......... 350/96.15

(Continued)

FOREIGN PATENT DOCUMENTS

EP    1 128 372 A2   8/2001
WO    WO 02/08310 A2   1/2002

OTHER PUBLICATIONS

Smolyaninov, I.I., et al., "*Experimental Study of Surface-Plasmon Scattering by Individual Surface Defects,*" published by The American Physical Society, Physical Review B, vol. 56, No. 3, Jul. 15, 1997, pps. 1601-1611.

(Continued)

*Primary Examiner*—Frank G. Font
*Assistant Examiner*—Mary El-Shammaa
(74) *Attorney, Agent, or Firm*—John F. McCabe

(57) ABSTRACT

An apparatus for performing optical routing includes a metal layer having first and second sides, a regular array of structures positioned along the first side, and an input optical waveguide positioned to illuminate a portion of the first side. The illuminated portion of the side is adjacent to ones of the structures. The apparatus also includes a plurality of output optical waveguides positioned to receive light radiated from portions of the metal layer not illuminated by the input optical waveguide.

9 Claims, 9 Drawing Sheets

U.S. PATENT DOCUMENTS

| | | | |
|---|---|---|---|
| 4,904,042 A | 2/1990 | Dragone | 350/96.16 |
| 5,002,350 A | 3/1991 | Dragone | 350/96.15 |
| 5,136,671 A | 8/1992 | Dragone | 385/46 |
| 5,973,316 A | 10/1999 | Ebbesen | 250/216 |
| 5,991,048 A | 11/1999 | Karlson et al. | 356/445 |
| 6,040,936 A | 3/2000 | Kim | 359/245 |
| 6,052,238 A | 4/2000 | Ebbesen | 359/738 |
| 6,236,033 B1 | 5/2001 | Ebbesen | 250/216 |
| 6,285,020 B1 | 9/2001 | Kim et al. | 250/216 |
| 6,362,907 B1 | 3/2002 | Stone et al. | 359/154 |
| 2003/0179974 A1* | 9/2003 | Estes et al. | 385/2 |
| 2003/0206708 A1* | 11/2003 | Estes et al. | 385/130 |

OTHER PUBLICATIONS

European Patent Office Search Report for EP Application No. 032555061.8-2216, 3 pages, dated Nov. 27, 2003.

Egorov, D., et al., "Two-dimensional control of surface plasmons and directional beaming from arrays ofsubwavelenth apertures," The American Physical Society, Physical Review B, vol. 70, pp. 033404-1-0033404-4, 2004.

"Photonic surfaces for surface-plasmon polaritions", W.L. Barnes et al, J. Opt. Soc. A/vol. 14, No. 7 (Jul. 1997) XP-000996967, pp. 1654-1661.

* cited by examiner

OPTICAL ROUTERS BASED ON SURFACE PLASMONS

BACKGROUND

1. Field of the Invention

The invention relates to wavelength-selective optical routers.

2. Discussion of the Related Art

All-optical routers do not convert an input optical signal into an intermediate electrical signal prior to transmitting an output optical signal. By avoiding conversions between light and electrical signals, all-optical routers are typically able to perform routing more rapidly than non all-optical routers. All-optical routers are also typically simpler devices than non all-optical routers because of the absence of conversions between optical and electrical signals. Higher speed and lower complexity has made conventional all-optical routers widely preferred over non all-optical routers.

Though all-optical routers have desirable operating speeds, fabricating such devices is often complex and expensive. For example, many all-optical routers use arrayed waveguides. Fabricating suitable arrayed waveguides usually requires high precision methods and expensive masks. For that reason, all-optical routers are often costly. It is desirable to have optical routers that route at high speeds, but do not require costly and complex fabrication processes.

SUMMARY

The various embodiments provide optical routers that perform optical-to-electrical and electrical-to-optical signal conversions. The optical-to-electrical conversion creates a surface plasmon that propagates between input and output ports. The surface plasmon's propagation direction depends on the frequency of the input optical signal. The directional dependence of the propagation of the surface plasmon provides a wavelength-dependent routing of received optical signals. Since creation, annihilation, and propagation of surface plasmons are rapid processes, these non all-optical routers operate at high speeds.

In a first aspect, the invention features an apparatus for performing optical routing. The apparatus includes a metal layer having first and second sides, a regular array of structures positioned along the first side, and an input optical waveguide that is positioned to illuminate a portion of the first side. The illuminated portion of the first side is adjacent to ones of the structures. The apparatus also includes a plurality of output optical waveguides positioned to receive light radiated from portions of the metal layer not illuminated by the input optical waveguide.

In a second aspect, the invention features a method for routing optical signals. The method includes producing a jet of surface plasmons on a metal surface in response to receiving an optical signal from an input optical waveguide. The method includes selectively producing an optical signal in a first output optical waveguide from the produced jet in response to the received optical signal having a first wavelength. The method also includes selectively producing an optical signal in a second output optical waveguide from the produced jet in response to the received optical signal having a second wavelength.

BRIEF DESCRIPTION OF THE FIGURES

Like reference numbers refer to functionally similar elements in the various Figures.

DESCRIPTION OF THE ILLUSTRATIVE EMBODIMENTS

Various embodiments provide non all-optical routers. The new optical routers perform intermediate optical-to-electrical and electrical-to-optical conversions that involve the creation and annihilation of surface plasmons at a metal surface. The surface plasmons are created by photons received at input optical port. The annihilation of the surface plasmons creates photons at output optical ports. These optical-to-electrical and electrical-to-optical signal conversions are single particle events that are constrained by particle kinematics at a planar interface.

Figure 1:
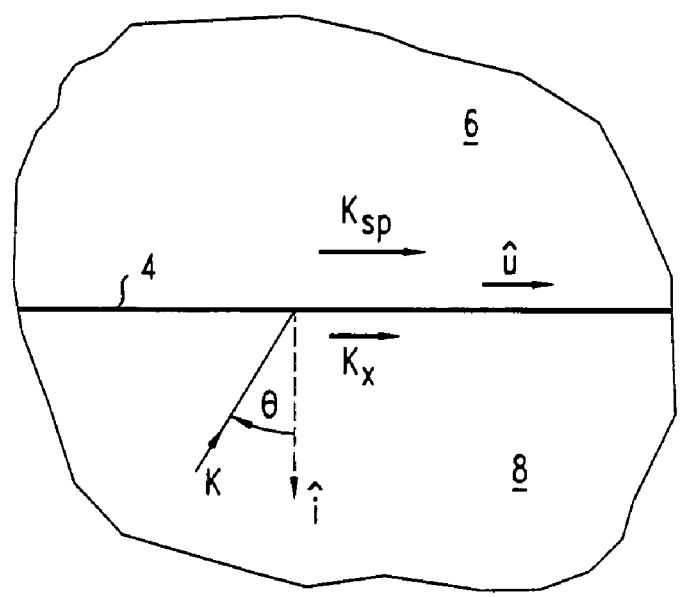
FIG. 1 is cross-sectional view illustrating the kinematics of the creation of a surface plasmon by a photon at a planar metal-dielectric interface.

FIG. 1 illustrates kinematics for creation of a surface plasmon at a planar interface 4 between a metal layer 6 and a dielectric substrate 8. A unit vector, î, is normal to the metal-dielectric interface 4, and a unit vector, û, is parallel to the metal-dielectric interface 4. A photon of momentum, K, and frequency, ω, is incident on the front side of the metal-dielectric interface 4. The incident photon makes an angle θ with the unit vector, î, normal to the metal-dielectric interface 4. When an incident photon creates a single surface plasmon. the surface plasmon has the same frequency ω and a momentum $K_{sp}$. The surface plasmon propagates along a direction defined by the unit vector û. The surface plasmon's momentum $K_{sp}$ may be completely in, partially in, or perpendicular to the photon's incidence plane as described below.

The energy and momenta of photons and surface plasmons satisfy dispersion relations. The dispersion relation for a single surface plasmon is:

$$K_{sp}(\omega) = (\omega/c)([\in_m(\omega)\in_d]/[\in_m(\omega)+\in_d])^{1/2}\hat{u},$$

Here, $\in_m(\omega)$ and $\in_d$ are dielectric constants of the metal and dielectric on the two sides of the interface 4, and c is the speed of light. The dispersion relation for the projection, $K_x(\omega)$, of the photon's momentum, K, onto the metal-dielectric interface 4 is:

$$|K_x(\omega)|=(\omega/c)(\in_d)^{1/2}\sin(\theta).$$

The magnitude of the projection, $|K_x|$, depends on the photon's incidence angle.

Figure 2:
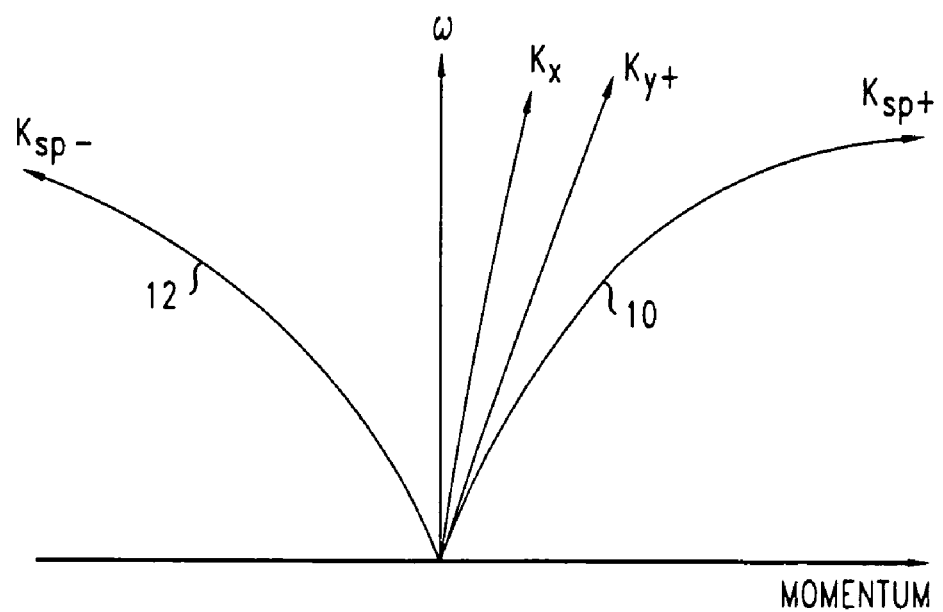
FIG. 2 illustrates dispersion relations for surface plasmons and photons at the interface of FIG. 1.

FIG. 2 illustrates dispersion curves relevant to creation of a single surface plasmon and by a single photon at a metal-dielectric interface that is translation invariant along itself. At such an interface, both the energy and the projection of the momentum along the interface are conserved. The conservation of energy requires that the annihilated photon and created surface plasmon have the same frequency, $\omega$. The conservation of the projection of the momentum along the interface requires that $K_x$ and $K_{sp}$ be parallel to the same unit vector $\hat{u}$, and further requires that $K_x(\omega)=K_{sp}(\omega)$.

The momenta of surface plasmons propagating parallel and anti-parallel to the projected photon momentum $K_x(\omega)$ are given by branches $K_{sp+}(\omega)$ and $K_{sp-}(\omega)$. The condition $K_x(\omega)=K_{sp}(\omega)$ can only be satisfied if one of the photon's limiting dispersion curves $K_{x\pm}(\omega)$, i.e., $K_{x\pm}(\omega)=\pm(\omega/c)(\in_d)^{1/2}$, crosses the surface plasmon's dispersion curve. Since neither of the limiting forms $K_{x\pm}(\omega)$ crosses $K_{sp+}(\omega)$ or $K_{sp-}(\omega)$, crossing points do not exist between the photon and surface plasmon dispersion curves. For that reason, a single photon cannot be converted into a single surface plasmon at a metal-dielectric interface that is translation invariant along itself.

The inventors realized that a single photon can however, be converted to a single surface plasmon at an interface that is not translation invariant along itself. On such interfaces, dispersion curves do not have to cross for resonant production of surface plasmons.

Figure 3:
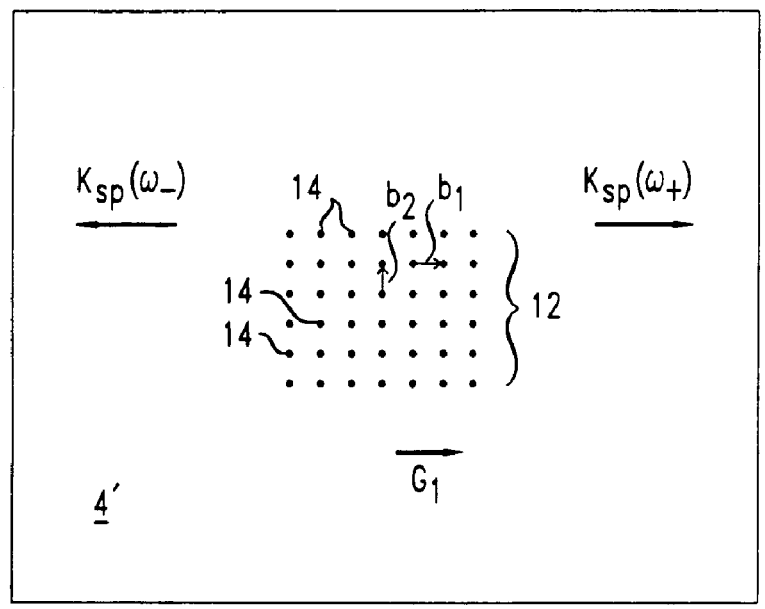
FIG. 3 is a top view of an interface without translation invariance along itself.

FIG. 3 shows a metal-dielectric interface 4' without translation invariance along itself. Translation invariance is broken by a finite regular array 12 of deformations 14 in the interface 4'. Exemplary deformations 14 include dimples and holes in the material on either side of the interface 4'. The deformations 14 define a regular lattice of sites at lattice positions P. The lattice positions P are defined by $P=mb_1+nb_2$ where $b_1$ and $b_2$ are fundamental lattice vectors and n and m are integers. Associated with the regular lattice 12 of deformations 14 is a reciprocal lattice with fundamental vectors $G_1$ and $G_2$. The reciprocal lattice vectors are defined the relations:

$$G_i \cdot b_j = 2\pi\delta_{i,j}.$$

The reciprocal lattice has a role in the creation of surface plasmons on the metal-dielectric interface 4'.

The regular array 12 reduces full translation invariance along the metal-dielectric interface 4' to a discrete subgroup. The discrete subgroup includes translations by integer multiples of the array's lattice fundamental vectors $b_1$ and $b_2$. Due to the reduced translation invariance, energy-momentum conservation takes a modified form for a photon incident on portions of metal-dielectric interface 4' inside the finite regular array 12. For such photons, resonant conversion of a single photon into a single surface plasmon is constrained by the modified momentum conservation relation:

$$K_{sp}(\omega)=K_p(\omega)+rG_1+sG_2.$$

Here, "r" and "s" are integers, and $G_1$ and $G_2$ are the above-described reciprocal lattice vectors for the finite-size regular array 12.

The modified conservation law is valid for large enough arrays 12 to produce approximate translation symmetry inside the array 12. Typically, this would require that the array 12 have, at least, four or more rows and/or columns of substantially identical deformations 14. Exemplary arrays 12 are invariant under discrete translations in 1 or 2 independent lattice directions.

Unlike the momentum conservation rule for a translation invariant interface, the above modified momentum conservation rule has solutions in which a single incident photon creates a single surface plasmon. The created surface plasmons propagate in directions correlated to reciprocal lattice vectors of the regular array 12.

Figure 4:
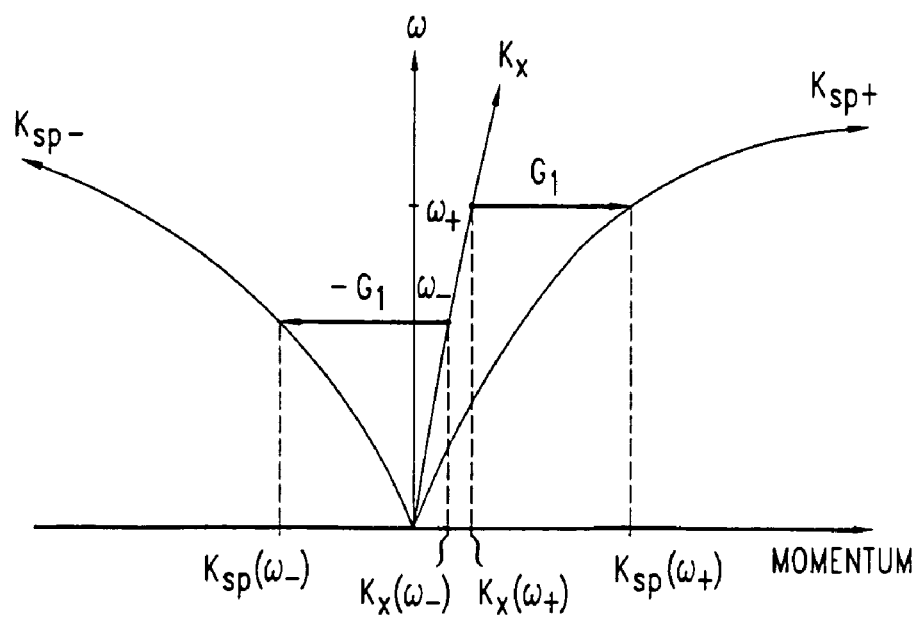
FIG. 4 illustrates how dispersion relations enable creation of a single surface plasmon in the incidence plane of a photon.

FIG. 4 shows particle dispersion curves relevant to creating a surface plasmon with a momentum in the photon's plane of incidence on the metal-dielectric interface 4' of FIG. 3. The dispersion curves show that an incident photon of frequency $\omega_+$ will create a surface plasmon of momentum $K_{sp}(\omega_+)$ where $K_{sp(\omega+)}=K_x(\omega_+)+G_1$. The dispersion curves also show that an incident photon of frequency $\omega_-$ will create a surface plasmon of momentum $K_{sp}(\omega_-)$ where $K_p(\omega_-)=K_x(\omega_-)-G_1$. The frequencies $\omega_+$ and $\omega_-$ are different, and the created surface plasmons have momenta $K_{sp}(\omega_+)$ and $K'_{sp}(\omega_-)$, which are anti-parallel to each other. For these reasons, incident photons of frequencies $\omega_+$ and $\omega_-$ produce surface plasmons that propagate in opposite directions on the interface 4'. The reduced symmetry of the metal-dielectric interface 4' makes the propagation direction of created surface plasmons frequency-dependent. The frequency dependence of the propagation of surface plasmons can produce wavelength-dependent optical routing (see below).

Figure 5:
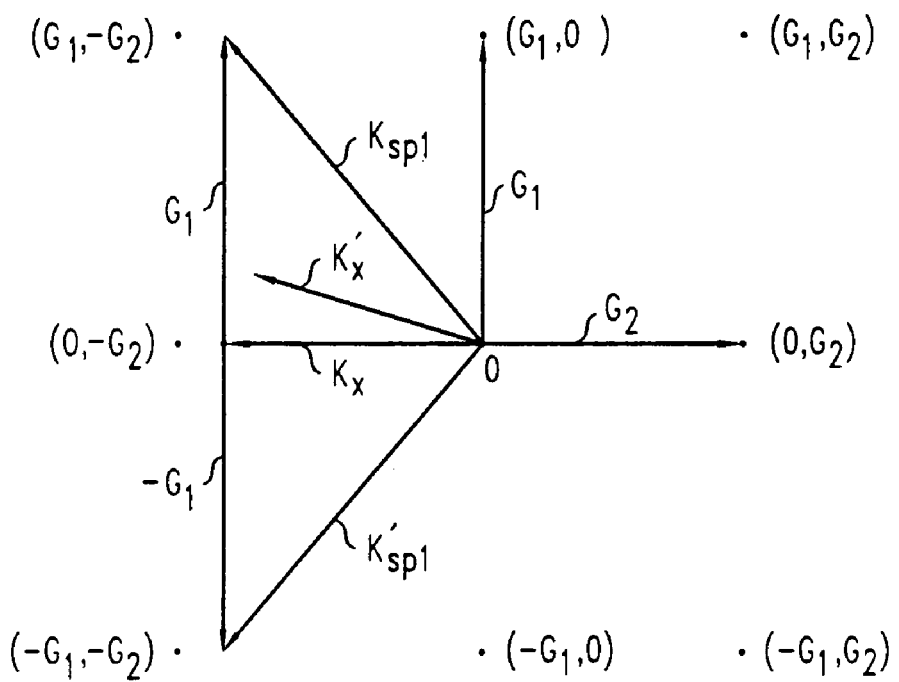
FIG. 5 illustrates how incident photons produce surface plasmons with more than one momentum when the projected photon momentum is perpendicular to a reciprocal lattice vector.

The modified momentum conservation relation also has solutions for which $K_{sp}(\omega)$ and $K_x(\omega)$ are not parallel provided that the array 12 has two independent lattice directions. FIG. 5 shows an exemplary solution for which $K_{sp1}=K_x+G_1$ with $K_x$ perpendicular to $G_1$. This solution requires that $|K_{sp}|$ and $|K_x|$ solve the photon and surface plasmon dispersion relations for the same frequency $\omega$. Since $K_x$ and $G_1$ are perpendicular, the momentum $|K'_{sp1}|$ and $|K_x|$ defined by $K'_{sp1}=K_x-G_1$ also solve the respective photon and surface plasmon dispersion relations for the same frequency $\omega$. Thus, photons with projected momenta $K_x$ perpendicular to reciprocal lattice vector $G_1$ can create a surface plasmon with different momenta.

Situations where a photon can create surface plasmons with several momenta values are not efficient if only one of the produced types of surface plasmon is able to make output photons. To avoid producing surface plasmons with more than one momentum value, the photon's incidence plane photons can be selected so that the photons have projected momenta $K'_x$ not orthogonal to the reciprocal lattice vectors $G_1$ and $G_2$ as shown in FIG. 5.

Figure 6:
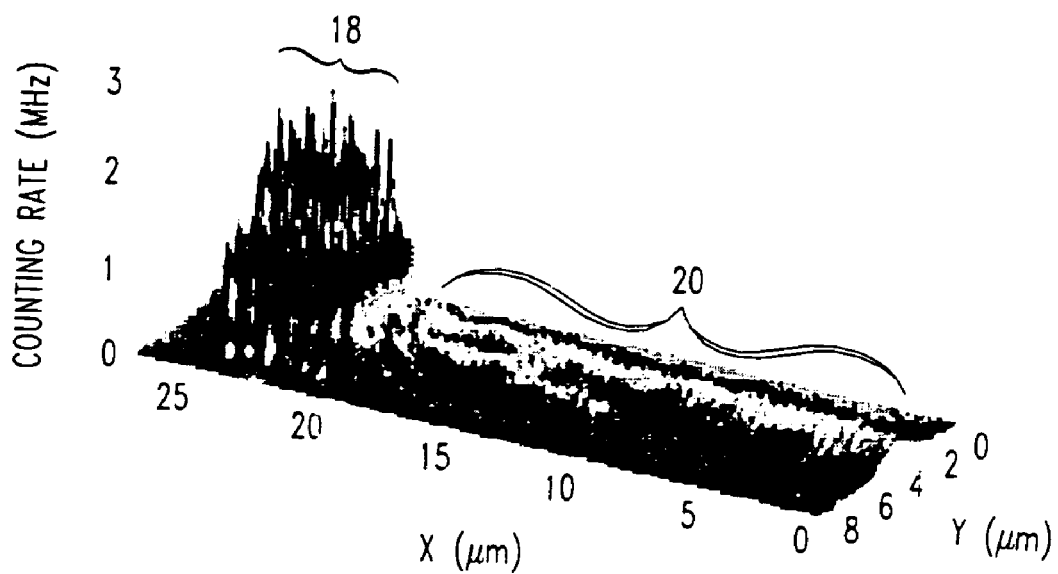
FIG. 6 shows electric field intensities that are induced on a back side of a metal layer of FIG. 3 in response to a front side of the metal layer being illuminated.

FIG. 6 shows electric field intensities produced at a back side of an exemplary metal layer described by FIG. 6 in response to illuminating the exemplary metal layer's front side with 760 nanometer (nm) laser light. The front side of the metal layer forms an metal-dielectric interface with a dielectric fused silica substrate. In FIG. 6, measured electric field intensities are proportional to measured photon counting rates. During acquisition of the data of FIG. 6, the metal layer was illuminated by collimated laser light that was incident on the front side of the metal layer at an angle of about 50° to the layer's normal vector. The laser light is incident on a 6×7 rectangular array of holes in the metal layer. The holes have diameters of about 200 nanometers (nm) and form a finite regular lattice whose lattice vectors $b_1$ and $b_2$ have lengths of 840 nm and 950 nm, respectively. During the illumination electric field intensities were measured by scanning a finely pulled end of an optical fiber along the backside of the metal layer and counting photon production rates in the optical fiber.

In FIG. 6, the 2D plot of electric field intensities has two prominent features. A first feature is an array 18 of large peaks. The array 18 of large peaks is located over the portion of the metal layer pierced by a regular cubic array of holes. The array 18 of large peaks results from the array of holes in the gold layer. A second feature is a straight line 20 starting end at the array of holes in the gold layer. Along the line 20 electric field intensities have elevated values due to evanescent electrical fields of surface plasmons. The straight line 20 shows that photons incident on a metal-dielectric interface with a regular array of deformations will produce surface plasmons with a limited number of propagation directions. For the experimental layer of gold, the produced surface plasmons propagate without significant dissipation over distances of 20 microns or more.

FIGS. 7A–7E are gray-shade plots that show electric field intensities along the back side of the same metal-dielectric interface already shown in FIGS. 3 and 6. Inserts in the FIGS. 5A–5E illustrate the modified momentum conservation relations associated with creating surface plasmons. In FIGS. 5A–5E, the electric field intensities were produced by illuminating the front side of the interface with various laser light configurations. The lighter and darker shaded portions of the plots correspond to respective higher and lower electric field intensities. In the plots, the electric field intensity has a cubic array 22 of peak values over the array of deformations, i.e., holes, in the metal layer. In the plots, other relatively high values of the electric field intensity are associated with the evanescent electric fields of surface plasmon jets 24, 26, 28. The surface plasmons of the jets 24, 26 propagate outward from the array 22 of deformations associated with the array 22 of peaks. The final jet 28 is produced by surface plasmons that are propagating outward from another array of holes in the metal layer (not shown).

Figure 7A:
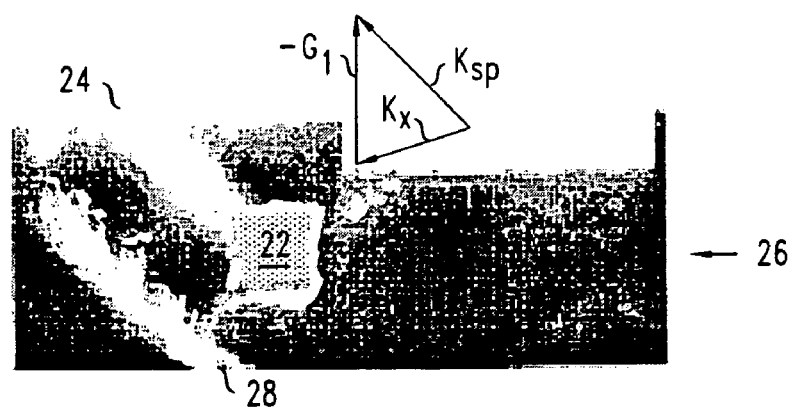
FIGS. 7A–7E are gray-shade plots of electric field intensities along the back side of the metal layer of FIG. 3 for various light configurations incident on the metal layer's front side.
Figure 7B:
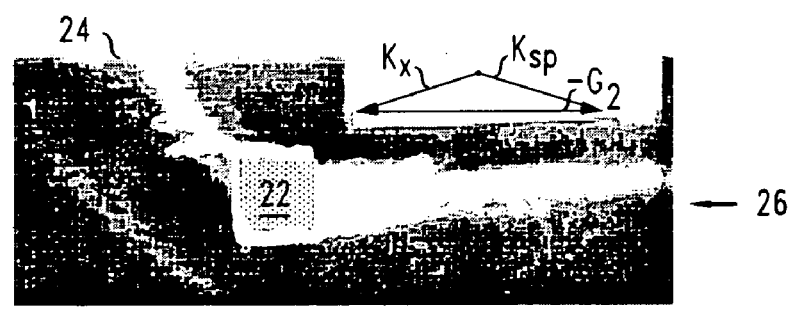

A comparison of FIGS. 7A and 7B shows that varying the frequency of incident laser light enables selective excitation of surface plasmon jets. FIGS. 7A and 7B illustrate jets of surface plasmons excited by laser light with the same incidence direction, but different frequencies $\omega$ and $\omega'$. At the frequency $\omega$, the laser light strongly excites surface plasmons of momenta $K_{sp}(\omega)$ where $K_{sp}(\omega)=K_x(\omega)-G_1$. These surface plasmons belong to the jet 24 of FIG. 5A. At the frequency $\omega'$, the laser light excites much fewer surface plasmons with momenta $K_{sp}'(\omega)$ equal to $K_x(\omega')-G_1$. This is seen by the lower intensity of evanescent light along the jet 24 in FIG. 7B. At the frequency $\omega'$, the laser light much more strongly excites surface plasmons of momenta $K_{sp}'(\omega)$ where $K_{sp}'(\omega)=K_x(\omega)-2G_2$. This is seen by the relatively higher intensity of evanescent light in the jet 26 of FIG. 7B. Thus, conversion of photons into surface plasmons can be substantially switched between the jets 24 and 26 by changing the frequency of the incident laser light between $\omega$ and $\omega'$.

Figure 7C:
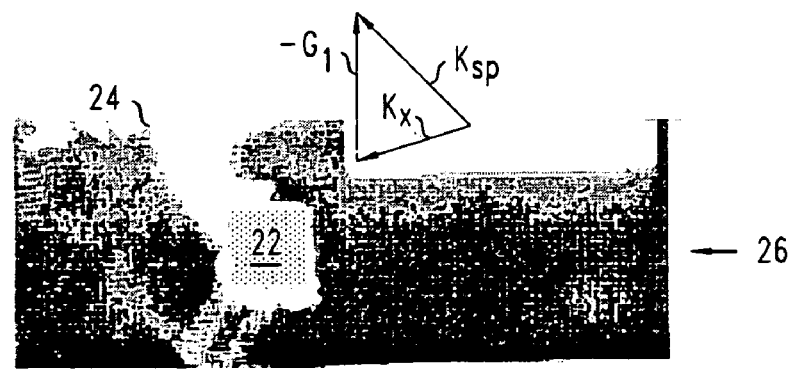
Figure 7D:
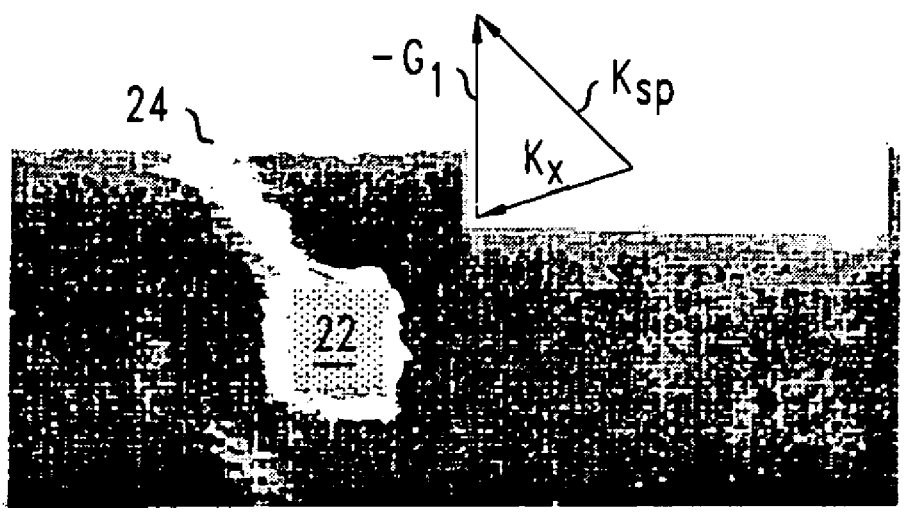
Figure 7E:
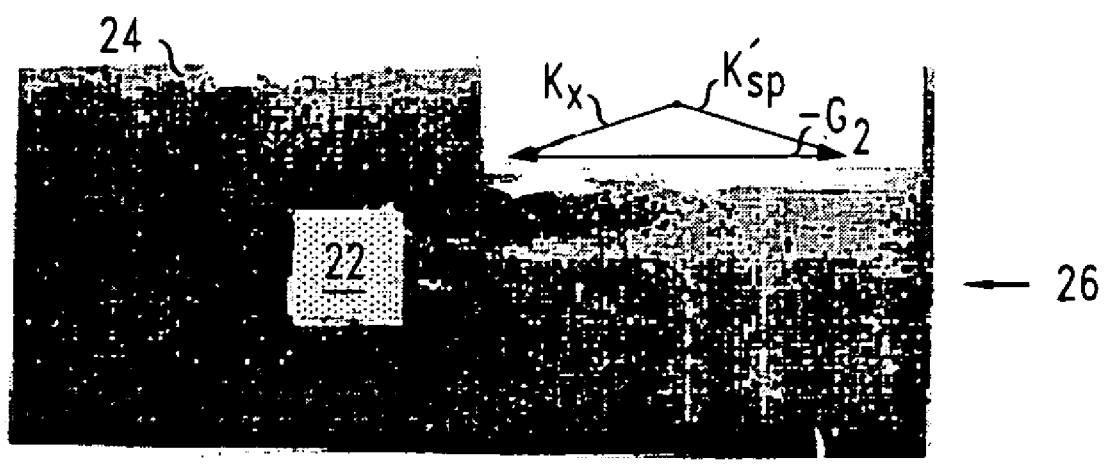

A comparison of FIGS. 7B and 7D shows that varying the incidence angle of the laser light enables selective excitation of surface plasmon jets. FIGS. 7B and 7D illustrate jets of surface plasmons excited by laser light of the different respective incidence angles $\theta$ and $\theta'$ and the same frequency $\omega'$. As the light's incident angle varies from $\theta$ to $\theta'$, the jet 26 turns off while the jet 24 remains at approximately the same intensity. As the light's incidence angle is varied further in the same direction without changing frequency, both jets 24 and 26 substantially turned off as shown in FIG. 7E.

A comparison of FIGS. 7B and 7C shows that varying the polarization of laser light also enables selective excitation of surface plasmon jets 24, 26. FIGS. 7B and 7C show surface plasmon jets excited by laser light with the same frequency and incidence direction but different polarizations. In FIG. 7B, the electric field of the incident light is not orthogonal to either jet 24, 26. For that reason, surface plasmons are excited in both jets of FIG. 7B. In FIG. 7C, the electric field of the incident light is perpendicular to the direction of the jet 26. In FIG. 7C, the jet 26 is not excited, because surface plasmons are longitudinal electron density waves and thus. are not excited by electric fields perpendicular to their propagation direction. In the incidence configuration of FIG. 7B, only one polarization of the incident laser light excites surface plasmons in the jet 26, i.e., the polarization parallel to the jet 26.

As FIGS. 6 and 7A–7E illustrate, a regular array of deformations enables a metal-dielectric interface to produce optical-to-electrical and electrical-to-optical signal conversions that involve jets of surface plasmons. The directional dependence of the production of surface plasmons enables construction of optical routers that are based on photon-to-surface plasmon and surface plasmon-to-photon conversions. Fabricating such non all-optical routers requires simpler and often less-costly methods, but still enables high routing speeds due to the absence of a need for circuitry to produce the conversions between optical and electrical signals.

Figure 8:
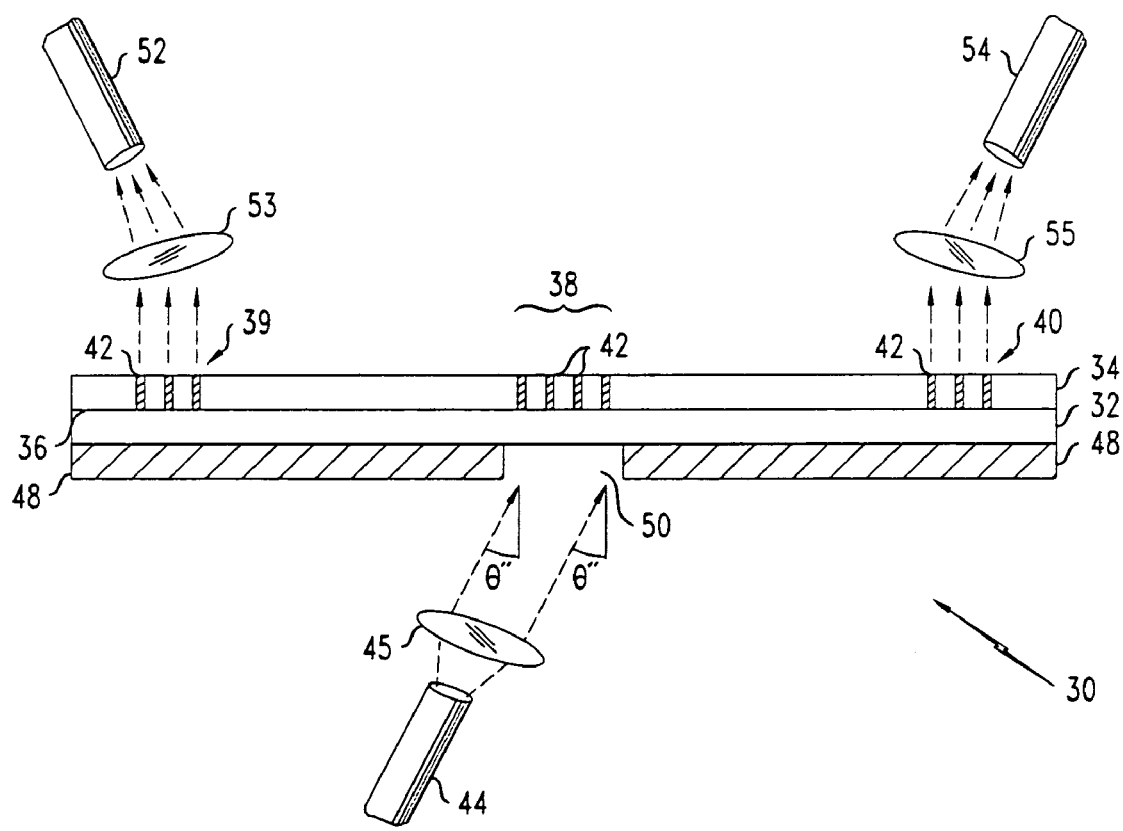
FIGS. 8 and 9 are respective cross-sectional and back side views of an optical router that performs frequency-selective optical routing.
Figure 9:
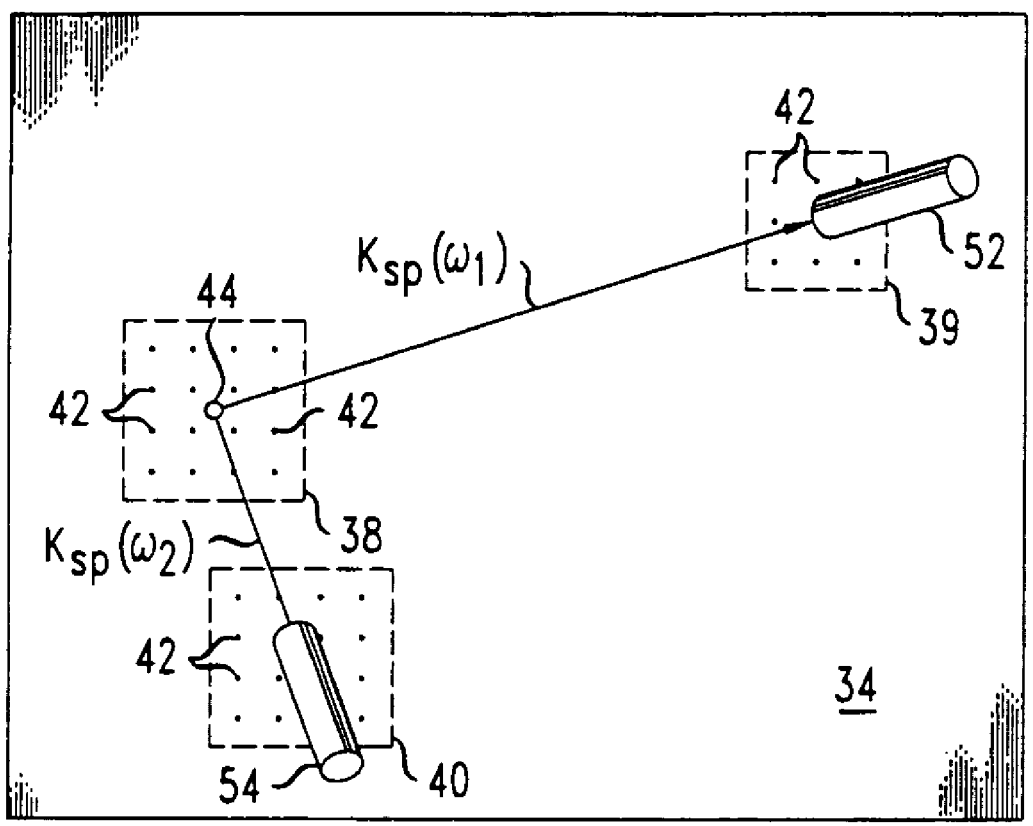

FIGS. 8 and 9 show an Optical router 30 that performs frequency-selective optical routing by creating jets of surface plasmons. The optical router 30 includes a dielectric layer 32 and a metal layer 34 located on the dielectric layer 32. The metal layer 34 includes a metal such as gold, copper, silver, or aluminum and has a thickness of 1–5 times a skin depth of the wavelength of light being routed. Exemplary dielectric layers 36 include hard dielectrics such a silica glass and soft dielectrics such as air. The front side of the metal film 34 forms a planar interface 36 with the dielectric layer 32.

The metal-dielectric interface 36 includes first, second, and third regular arrays 38–40 of deformations 42. The deformations 42 may be holes, dimples, straight vias, bumps, or straight ridges in the metal layer 34, the dielectric substrate 32, or both. Exemplary deformations 42 traverse the entire metal layer 34. Preferably, each array 38–40 includes a series of four or more substantially identical and equally spaced rows of deformations 42 along one direction. Such array sizes produce an approximate discrete translation symmetry inside the arrays 38–40 thereby enabling resonant generation of surface plasmons when the above-described modified momentum conservation relations are satisfied. Some arrays 38–40 also include a series of four or more substantially identical and equally spaced deformations 42 in each row thereby producing approximate discrete translation symmetries in two independent directions on the metal-dielectric interface 36.

In some embodiments, the first, second, third regular arrays 38–40 of deformations 42 are portions of a single regular array of identical and equally spaced deformations 42 on the metal-dielectric interface 36. Exemplary regular arrays have the lattice types such as simple cubic, body-centered cubic, triangular, etc.

The optical router 30 includes an input optical waveguide 44, a lens 45, and an opaque layer 48. Exemplary input optical waveguides 44 include single or multi-mode optical fibers. The input optical waveguide 44 is positioned to illuminate a portion of a front side of the metal-dielectric interface 36 with the input light signals being routed. The lens 45 collimates the input light from the input optical waveguide 44 so that the input light is incident on the interface 36 at a single angle θ". The opaque layer 48 includes a window 50 over the first array 38 of deformations 42. The window enables the input light signals to create surface plasmons in the first array 38, and stops input light from directly creating surface plasmons in the other arrays 39–40 on the metal-dielectric interface. For this reason, the input light signals only create surface plasmons that propagate outward from the first array 38.

The optical router 30 also includes first and second output optical waveguides 52, 54, and corresponding insertion lenses 53, 55 located at the backside of the interface 36. Exemplary output optical waveguides 52, 54 include single and multi-mode optical fibers. The lens 53 focuses light radiated by surface plasmons propagating through array 39 into the first output optical waveguide 52. The lens 55 focuses light by surface plasmons propagating through the array 40 into the second output optical waveguide 54.

The arrays 39 and 40 lie along different angular directions with respect to a center defined in the first array 38. For that reason, a surface plasmon propagating outward from the first array 38 will propagate through, at most, one of the arrays 39 and 40 of deformations 42. Thus, individual surface plasmons created by input light signals only produce an output light signal in one of the output optical waveguides 52 and 54.

The relative orientations of the input optical waveguide 44 and the first array 38 cause input light of frequency $\omega_1$ and $\omega_2$ to create surface plasmons that propagate towards the array 39 and the array 40, respectively. The orientation of the input optical waveguide 44 with respect to both the metal-dielectric interface 36 and the first array 38 insure that such created surface plasmons have momenta that satisfy the above-described modified momentum conservation relations. For that reason, input light signals frequency $\omega_1$ and $\omega_2$ resonantly create jets of surface plasmons propagating towards the second array 39 and the third array 40, respectively.

A preferred embodiment of the non all-optical router 30 causes input light of frequency $\omega_1$ to only create surface plasmons that propagate towards the second array 39 and causes input light of frequency $\omega_2$ to only create surface plasmons that propagate towards the third array 40. In one such configuration, the incidence plane of the input light includes a reciprocal lattice vector of the first array 38, and the arrays 39 and 40 are on opposite sides of the first array 38 as illustrated by FIGS. 4 and 8.

The relative orientation of the output optical waveguide 52 with respect to both metal-dielectric interface 36 and second array 39 is designed so that a surface plasmon propagating outward from the first array 38 will resonantly radiate light in the second array 39. Furthermore, the radiated light will be directed towards the output optical waveguide 52. Thus, surface plasmons arriving in the second array 39 efficiently radiate photons at frequencies and momenta that satisfy previously discussed modified conservation relations with respect to the second regular array 39 of deformations 42. Such a relative orientation insures efficient coupling of input optical energy of frequency $\omega_1$ to the output optical waveguide 52.

Similarly, the relative orientation of the output optical waveguide 54 with respect to both metal-dielectric interface 36 and second array 40 is designed so that a surface plasmon propagating outward from the first array 38 will resonantly radiate light in the second array 40. Furthermore, the radiated light will be directed towards the output optical waveguide 54. Thus, surface plasmons arriving in the second array 40 efficiently radiate photons at frequencies and momenta that satisfy previously discussed modified conservation relations with respect to the third regular array 40 of deformations 42. Such a relative orientation insures efficient coupling of input optical energy of frequency $\omega_2$ to the output optical waveguide 54.

Figure 10:
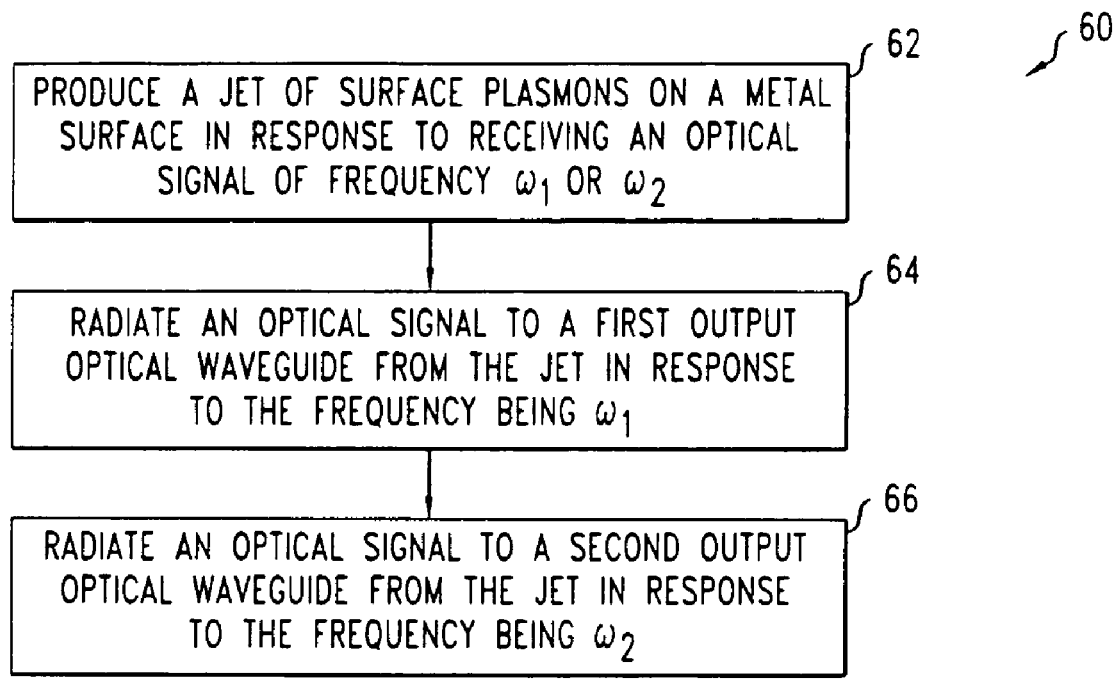
FIG. 10 illustrates a method for optically routing light with the optical router of FIGS. 8 and 9.

FIG. 10 illustrates a method 60 for optically routing light with the non all-optical router 30 of FIGS. 8 and 9. The optical router 30 produces a jet of surface plasmons on a metal surface in response to receiving an optical signal of frequency $\omega_1$ or $\omega_2$ from the input optical waveguide 44 (step 62). The jet radiates an above-threshold optical signal to the output optical waveguide 52 in response to the input optical signal having the frequency $\omega_1$ (step 64). The jet may also radiate an optical signal in the other output waveguide 54, but such an optical signal has a below-threshold value. The jet radiates an above-threshold optical signal to the other output optical waveguide 54 in response to the input optical signal having the frequency $\omega_2$ (step 66). The jet may also produce another optical signal in the output waveguide 52, but such an optical signal has a below-threshold value.

In addition to the optical router 30 of FIG. 8, various fiber-devices are also able to provide frequency-selective optical routing that is based on optical to electrical to optical conversions involving surface plasmons.

Figure 11:
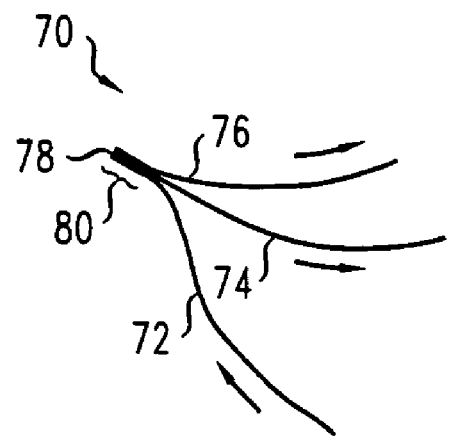
FIGS. 11 and 12 show a simple optical router that uses an end face of a fiber bundle to perform frequency-selective optical routing.

FIG. 11 shows a fiber bundle 70 that provides frequency-selective optical routing based on surface plasmons. The fiber bundle 70 includes an input optical fiber 72 and a plurality of output optical fibers 74, 76 for receiving light from the input optical fiber 72. In the fiber bundle 70, optical routing involves the propagation of surface plasmons along an end face 78 of the joined-fiber region 80 of the fiber bundle 70.

Figure 12:
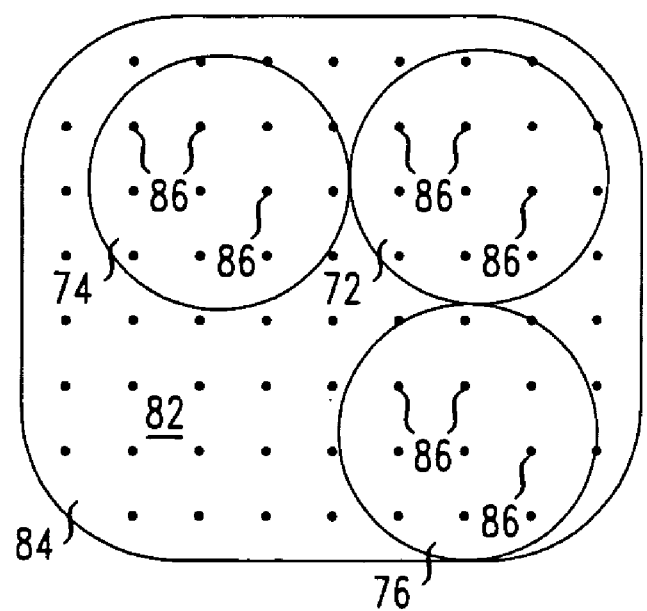

FIG. 12 provides an end view of the joined-fiber region 80 of FIG 11. In the joined-fiber region 80, an index matching medium 82 is disposed between ends of the optical fibers 72, 74, 76. The end face 78 of the joined-fiber region 80 has been planarized and coated with a metal layer, e.g., a gold layer, to produce a planar metal-dielectric interface 84. The planar metal-dielectric interface 84 includes an array of identical deformations 86. The deformations produce a 2-dimensional lattice periodicity along the end face 76. Exemplary deformations 86 are dimples in the dielectric or metal located on the two sides of the planar interface 84. Exemplary arrays of deformations 86 are produced by a well-known methods involving mask-controlled etches after planarizing the end face 78 of the joined-fiber region 80.

The pattern of deformations 86 is configured so that the input optical fiber 72 is able to optically excite surface plasmons that propagate along the planar interface 84. In particular, light of preselected first and second input frequencies will excite surface plasmons that selectively propagate to the first output fiber 74 and to the second output fiber 76, respectively. The periodic array of deformations 86 also enables the created surface plasmons to produce light that couples to the output optical fibers 74, 76. Thus, such surface plasmons produce frequency-selective optical routing between the optical Fibers 72, 74, 76 via a process that involves optical-to-electrical-to-optical conversions. The above discussion of modified momentum conservation relations would enable one of ordinary skill in the art to design an array of deformations 86 suitable for such optical routing.

In other fiber embodiments of optical routers, input and output optical fibers optically side-couple to a planar metal-dielectric interface. The optical fibers have coupling regions where portions of their optical cladding have been removed to enable optical cores of the fibers to optically couple the metal-dielectric interface. The metal-dielectric interface includes a periodic array of substantially identical deformations. Due to the array of deformations, the input optical fiber creates surface plasmons for selected input optical frequencies. Due to the array of deformations, the output optical fibers receive light radiated by surface plasmons that propagate through associated coupling regions on the metal-dielectric interface.

Referring again to FIGS. 8 and 11–12, some embodiments of the optical routers 30, 70 route optical signals based on incidence angle, incidence polarization, or dielectric constant at the metal-dielectric interface 36, 84 rather than based on optical frequency. In one such embodiment, the router 30 includes a mechanical device for varying the incidence angle θ" of light emitted from the input optical waveguide 44. In this router 30, input light produces surface plasmons that radiate to the first or second output optical waveguide 52, 54 based on the selected incidence angle θ". In another embodiment, the router 30 includes a variable voltage source connected to the metal layer 34 and configured to apply a voltage across the dielectric layer 32. The dielectric layer 32 is electro-optically active so that the applied voltage can change the layer's dielectric constant and thus, change the dispersion relation for surface plasmons at the interface 36. In this router 30, input light produces surface plasmons that radiate to the first or second output optical waveguide 52, 54 based on the selected voltage across the dielectric layer 32. In another embodiment, the router 30 includes a variable optical polarization rotator that is located between the end of input optical waveguide 44 and the lens 45. In this router 30, input light produces surface plasmons that radiate to the first or second output optical waveguide 52, 54 based on the selected incident polarization.

The invention is intended to include other embodiments that would be obvious to one of skill in the art in light of the description, figures, and claims.

We claim:

1. An apparatus for performing optical routing, comprising:
   a metal layer having first and second sides;
   a regular array of structures positioned along the first side;
   an input optical waveguide positioned to illuminate a portion of the first side, the portion being adjacent to ones of the structures; and
   a plurality of output optical waveguides positioned to receive light radiated from portions of the metal layer not illuminated by the input optical waveguide; and
   wherein the array is configured to cause first and second wavelengths of light from the waveguide to create surface plasmons that exit the illuminated portion along different directions.

2. The apparatus of claim 1,
   wherein the structures of the array are regularly distributed along two directions; and
   wherein the first and second ones of the output optical waveguides are positioned to receive light radiated from different portions of the metal layer, the different portions having different angular positions about a point located in the regular array.

3. The apparatus of claim 1, further comprising another regular array of structures along the first side, the another regular array being positioned to cause surface plasmons to radiate light towards one of the output optical waveguides.

4. Then apparatus of claim 1, wherein the regular array comprises a plurality of rows of the structures, adjacent ones of the rows being separated by substantially the same distance.

5. The apparatus of claim 1, wherein each row comprises a series of the structures, adjacent structures of one of the series being separated by the same distance.

6. The apparatus of claim 1, further comprising:
   a substantially transparent dielectric layer in contact with the first side of the metal layer.

7. The apparatus of claim 6, wherein the structures are selected from one of substantially identical holes in the metal layer and substantially identical holes in the dielectric layer.

8. The apparatus of claim 6, further comprising a device capable of varying the dielectric constant of the dielectric layer.

9. The apparatus of claim 1, further comprising a device capable of varying one of an incidence angle on the metal layer or a polarization for light emitted from the input optical waveguide.

* * * * *